Nov. 14, 1967  C. MARTIN ET AL  3,352,386
PISTON-TYPE HYDRAULIC DAMPER
Filed May 14, 1965   3 Sheets-Sheet 1
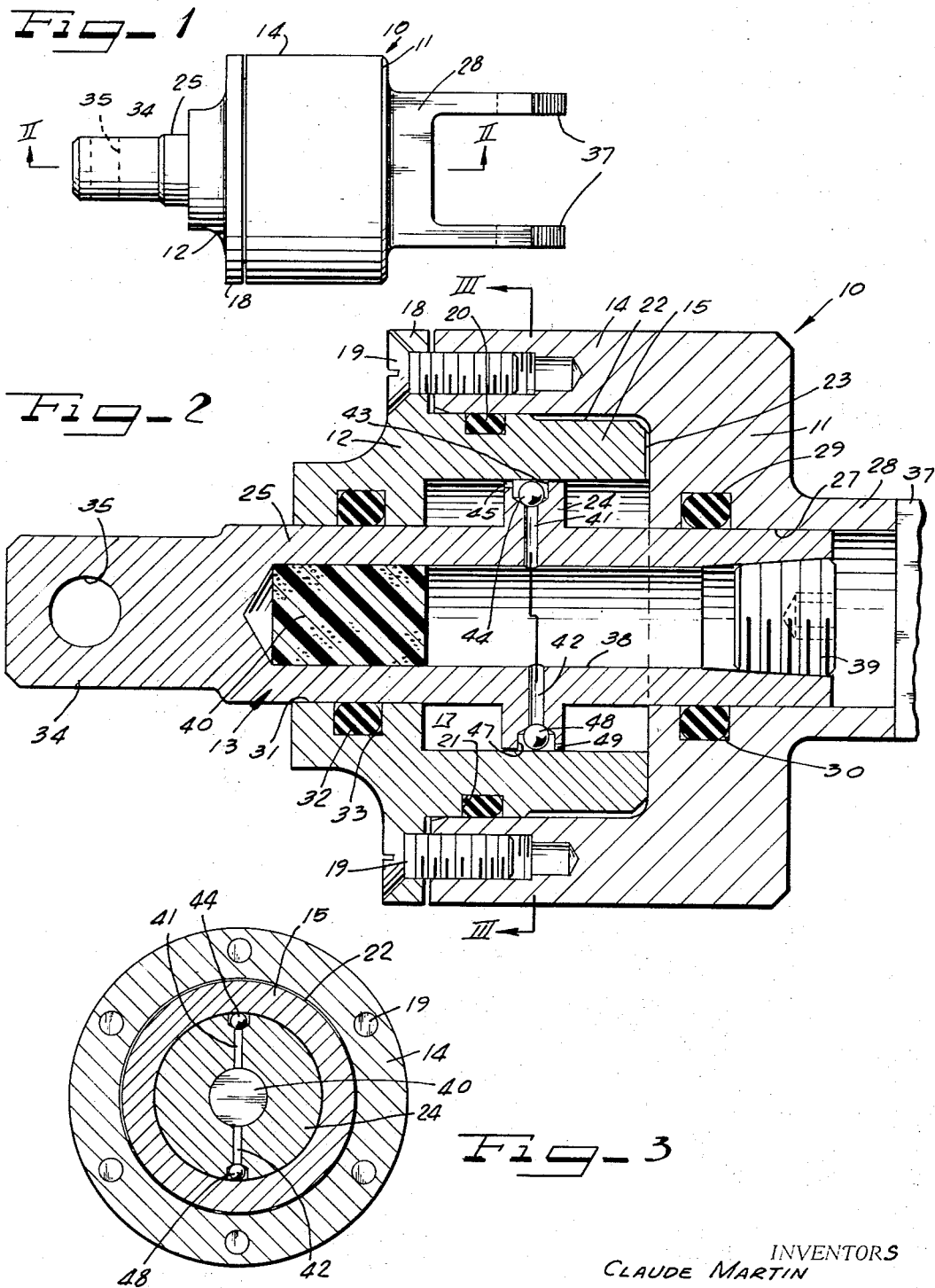
INVENTORS
CLAUDE MARTIN
EDWARD J. KROLLMAN
ROBERT E. KING
ROLLIN DOUGLAS RUMSEY
ATTORNEYS Nov. 14, 1967

C. MARTIN ET AL 3,352,386

PISTON-TYPE HYDRAULIC DAMPER

Filed May 14, 1965

INVENTORS
CLAUDE MARTIN
EDWARD J. KROLLMAN
ROBERT E. KING
ROLLIN DOUGLAS RUMSEY

BY Hill, Sherman, Meroni, Gross & Simpson
ATTORNEYS

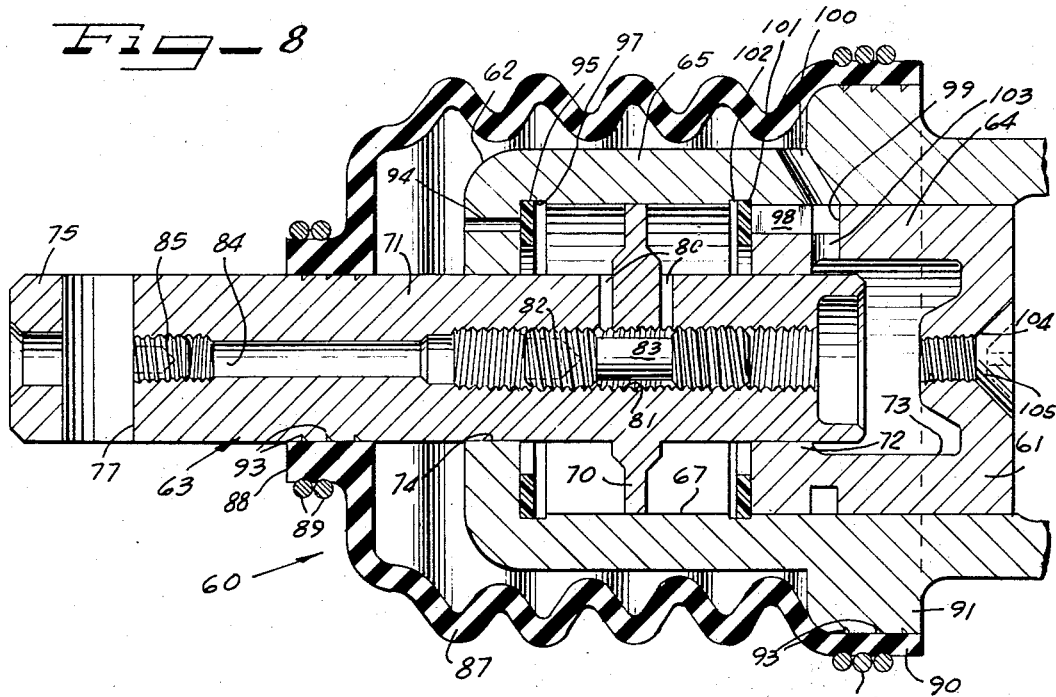
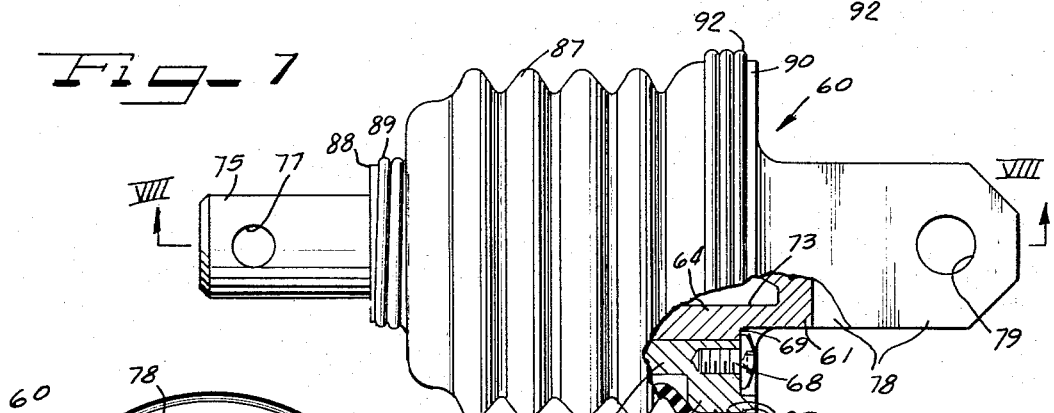
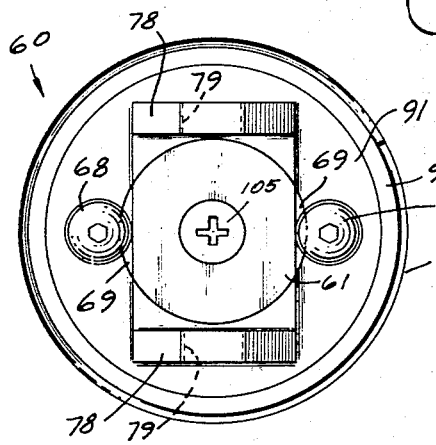

United States Patent Office 3,352,386
Patented Nov. 14, 1967

3,352,386
PISTON-TYPE HYDRAULIC DAMPER
Claude Martin, Buffalo, Edward J. Krollman, Boston, Robert E. King, Orchard Park, and Rollin Douglas Rumsey, Buffalo, N.Y., assignors to Houdaille Industries, Inc., Buffalo, N.Y., a corporation of Michigan
Filed May 14, 1965, Ser. No. 455,769
12 Claims. (Cl. 188—96)

This invention relates to improvements in piston-type hydraulic dampers and is more particularly concerned with dampers of this type which are especially suitable for damping flutter between relatively movable members to which relatively reciprocable components of the damper are respectively attached, but adaptable for numerous and various other uses requiring energy absorption, especially where a small, compact, rugged, efficient damping unit is indicated.

An important object of the present invention is to provide a piston-type hydraulic damper which may be selectively equipped to produce either linear characteristics of force versus velocity or square-law characteristics in which force varies as a square of the velocity.

A further object of the invention is to provide a new and improved piston-type hydraulic damper embodying novel replenishing means.

Still another object of the invention is to provide a new and improved linear damper housing construction.

Yet another object of the invention is to provide a new and improved damper especially suitable for damping flutter, and which is particularly constructed and arranged for miniaturization.

Other objects, features and advantages of the present invention will be readily apparent from the following detailed description of certain preferred embodiments thereof taken in conjunction with the accompanying drawings, in which:

FIGURE 1 is a side elevational view of a damper embodying features of the invention;

FIGURE 2 is an enlarged fragmentary longitudinal sectional detail view taken substantially on the line II—II of FIGURE 1;

FIGURE 3 is a reduced diametric sectional view taken substantially on the line III—III of FIGURE 2;

FIGURE 7 is a side elevational view, partially broken away and in section, of another modification of the damper;

FIGURE 8 is an enlarged fragmentary longitudinal sectional detail view taken substantially on the line VIII—VIII of FIGURE 7; and FIGURE 9 is an end elevational view looking toward the left of FIGURE 7.

Figure 4:
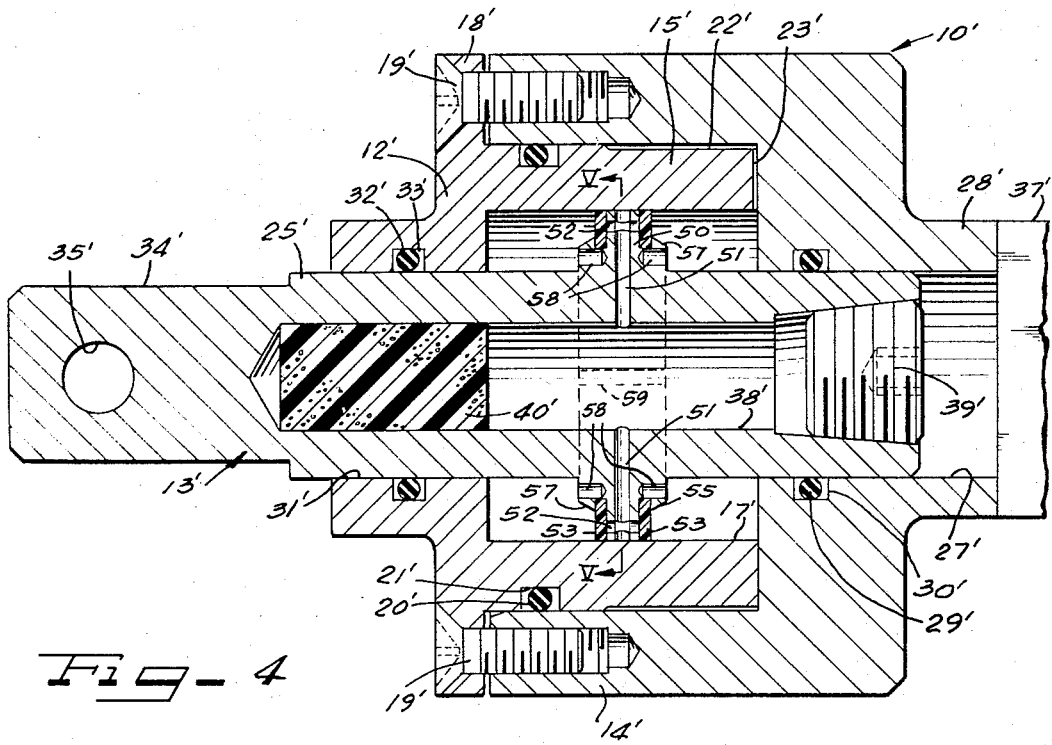
FIGURE 4 is a fragmentary longitudinal sectional detail view through a modified construction of the damper.

In all forms of the damper disclosed, an important consideration has been miniaturization so that the damper may be utilized as a flutter damper in and on smaller sizes of apparatus where weight and especially space limitations are important factors. Exemplary of uses for which the dampers of the present invention are suitable are as flutter dampers for missile control vanes, as dampers on business machines, and the like. According to the principles of all of the disclosed forms, they are adapted for uses in which maximum linear stroke of about ½-inch is desirable, and the units are capable of highly efficient damping function with a piston diameter of about ¾-inch in a housing not exceeding about 1½-inches in diameter.

In one practical embodiment of the invention as depicted in FIGURES 1–3, a damper 10 comprises three major components, namely, a pair of generally cup-shaped housing members 11 and 12 relatively telescopically interengaged, and a piston member 13. Desirably, the casing or housing members 11 and 12 have, respectively, cylindrical axially extending flanges 14 and 15 which are telescoped and define with and between the end portions of the housing members a cylindrical working chamber 17.

One of the housing members, herein the member 11, comprises the outer of the assembly, with the inner diameter of its axial flange 14 dimensioned to receive the complementary axial flange 15 of the other of the members which at its inner end abuts the inner wall of the end portion of the member 11. Means for securing the members 11 and 12 together comprise a lateral annular flange 18 on the head or end portion of the member 12 overlying the free end of the flange 14 and secured thereto by screws 19. To seal the joint between the flanges 14 and 15 against fluid leakage, means are provided comprising an O-ring 20, herein seated in an annular groove 21 opening from the outer wall surface of the flange 15 and engaging the opposing surface of the flange 14 adjacent to its free end. Build-up of hydraulic fluid pressure toward the seal 20 from within the working chamber 17 through the housing flange joint is minimized by providing the outer surface of the inner telescoped flange 15 with a slightly reduced diameter inner end portion 22 extending from the free end of this flange to adjacent, but substantially spaced from the groove 21 and the annular space about the piston 22 communicating with the working chamber 17 through a small radial vent or bleed groove 23 across the inner free end of the flange 15.

Linearly, relatively reciprocably operative in the cylindrical working chamber 17 is an annular piston flange 24 desirably formed integrally in one piece intermediately along the length of and projecting radially from a piston rod 25 comprising the piston unit 13. On its outer diameter or periphery, the piston flange 24 is complementary to the working cylinder diameter in predetermined loose fit relationship to afford damping energy absorption displacement of hydraulic damping fluid and affording linear damping since the damping flow varies directly with velocity. Damping resistance or strength is controlled by the amount of clearance between the piston and the cylinder and the viscosity of the damping fluid. Desirably such damping fluid may comprise a silicone, commercially available in a wide range of viscosities to meet various practical requirements, and has excellent temperature versus viscosity characteristics. Of course, other types of hydraulic damping fluid may be used if desired.

Relative reciprocable guidance of the piston 13 in the damper housing is effected by sliding guidance of the portion of the piston rod 25 which extends beyond one side of the piston flange 24 within a complementary guide bearing bore 27 extending axially through the closure head end portion of the housing member 11 and a boss 28 projecting from the outer side thereof. Leakage through the sliding bearing joint thus provided is substantially prevented by external sealing means comprising a sealing ring 29 mounted in an annular seal groove in the wall defining the bore 27.

Balanced operating guidance of the piston rod 25 at the opposite side of the piston flange 24 is through a complementary bearing bore 31 through the head end closure portion of the housing member 12 with the bearing joint sealed by a sealing ring 32 mounted in an annular groove 33 opening into the bore 31. Through this arrangement, the piston flange 24 is maintained in the predetermined damping gap peripheral relation to the cylindrical working cylinder wall by the balanced bearing guidance of the opposite end portions of the piston rod 25.

Means are provided for attaching the damper 10 to and between relatively moveable members to be damped. For this purpose, one end portion of the piston rod 25, herein that end portion which extends through the head end of the housing member 12, is provided with an integral outer end attachment extension 34 which may be provided with a connecting pin bore 35 transversely therethrough. This enables attachment of one end of the damper to one of the relatively movable members to be damped. For attaching the damper to the other of the relatively moveable members, means are provided on the housing and comprising, for example, a coupling bifurcation including a pair of spaced, co-extensive, parallel attachment ears 37 extending generally axially outwardly from and as integral parts of the housing boss 28 and from opposite sides of the outer end of the bearing bore 27.

In operation, as the members to and between which the damper 10 is attached tend to move toward or away from one another, damping resistance to such relative movement is afforded by the damper through the energy-absorbing linear damping displacement of hydraulic damping fluid around the piston flange 24 from one of the subchambers of the working chamber 17 to the other of the subchambers, depending on the direction of thrust reaction of the piston and housing responsive to said relative movements of the members.

In order to avoid any air pocket development in the working chamber 17 which might interfere with the full efficiency of the damper in its damping cycles, as might occur due to hydraulic fluid loss through external leakage, hydraulic fluid replenishing means are provided. In a practical form, such means comprise a longitudinal hollow, blind end bore chamber 38 in the piston rod 25 extending from a closed end adjacent to the attachment extension 34 to an opposite end opening through the end of the piston rod in the bearing bore 27. Such open end is closed by a preferably tapered threaded closure plug 39. The reservoir chamber thus provided is filled with hydraulic fluid which is maintained under replenishing pressure by means conveniently comprising a compressible body 40 located in the blind end bore end portion of the reservoir. A practical form of the pressurizing member 40 comprises a closed cell neoprene sponge of firm quality.

Communication between the replenishing reservoir 38 and the working chamber 17 is provided in such manner that the subchamber on the low pressure side of the piston flange is in relatively free communication with the reservoir and the subchamber on the high pressure side is blocked from such communication during cycling relative reciprocal movements of the piston and housing. To this end, respective radial passage bores 41 and 42 extend through the wall of the rod 25 and the piston flange 24. At its outer end, the passage bore 41 has a larger diameter counterbore 43 within which is seated a ball check valve 44, and from which a generally axially extending passage notch 45 communicates with the subchamber at one side of the piston flange 24, herein the side nearest the attachment end of the piston rod. Similarly, the outer end of the passage bore 42 has a counterbore enlargement 47 within which is accommodated a ball check valve 48, and from which communication is effected with the remaining subchamber through a generally axial communication passage notch 49. Through this arrangement, when the piston moves generally outwardly, in the direction of the attachment projection 34, the check valve 44 seats and blocks the passage 41, while when the piston moves in the opposite direction, the check valve 44 opens and the check valve 48 seats. This affords the replenishing communication to the low pressure side of the piston flange while maintaining the pressure side in full damping performance. It may be noted that the passages 41 and 42 are relatively offset toward the respective communication notches 45 and 49 whereby to shorten the communication distance between the respective subchambers.

Figure 5:
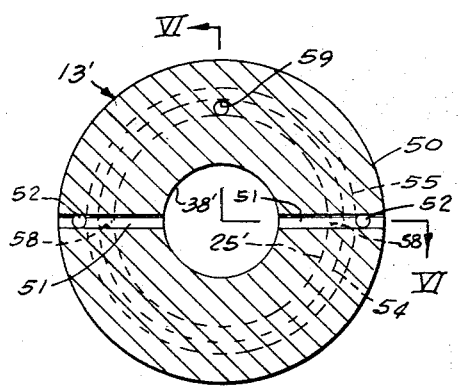
FIGURE 5 is a fragmentary diametrical sectional view taken substantially on the line V—V of FIGURE 4.
Figure 6:
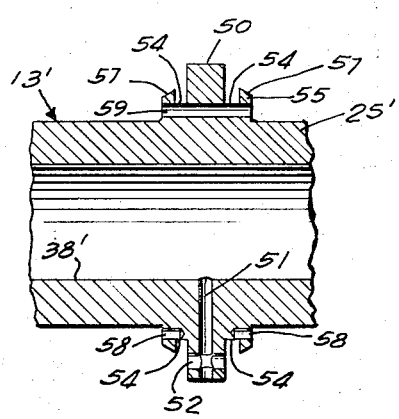
FIGURE 6 is a fragmentary longitudinal sectional detail view taken substantially on the line VI—VI of FIGURE 5.

Filling of the damper 10 with hydraulic fluid is effected through the open end of the reservoir 38 before the closure plug 39 is secured in place, but after all other parts of the damper including the pressurizing, but at that time uncompressed, sponge plug 40, are assembled. Then the damper unit is upended, with the open end of the reservoir 38 upwardly, and completely filled with the hydraulic fluid, inclusive of the working chamber 17 and the reservoir 38 into the space to be occupied by the closure or filler opening plug 39. Thereupon, the plug 39 is screwed into place, preferably with its outer end flush with the end of the piston rod, and this causes hydraulic fluid which extended into the filler opening area to be displaced by the filler plug toward the pressure plug 40 which compresses proportionally to the thus displaced volume of the hydraulic fluid and develops a continuous pressure on the fluid in the replenishing reservoir 38 whereby to maintain the hydraulic system filled and free from development of any air pockets which might interfere with damping efficiency.

Where it is desired that the damper operate with square-law characteristics, the modified damper 10' (FIGS. 4–6) may be utilized. In this damper, all of the same parts are used as in the damper 10, except in the area of the piston flange and therefore primed reference numerals designate the same parts and description of such parts will be understood to be the same as the corresponding parts in the damper 10, and for the sake of brevity is not repeated. In the damper 10' a piston flange 50 integral in one piece with the piston rod 25' divides the work chamber 17' into subchambers in substantially the same manner and to the same effect as the piston flange in the damper 10, but the piston flange 50 is in as close perimeter sliding fit with the cylindrical wall defining the chamber 17' as is practicable while affording free and easy relative reciprocal movement.

For replenishing flow communication between the reservoir 38' and the working chamber 17', identical, aligned passage bores 51 extend through the wall of the hollow piston rod 25' and radially medially through the piston flange 50, which adjacent to but spaced from its perimeter has respective axially extending communication ports 52 therethrough intersecting the passage bores 51. In control of the ports 52, on each side of the piston flange 50 are respective ring disk flapper-type resiliently flexible valves 53 operative substantially as piston rings on the pressure side of the piston to prevent hydraulic fluid displacement past the perimeter of the piston flange and flexing open on the low pressure side to pass replenishing fluid from the reservoir 38' through the ports 52. For this purpose, the ring flange members 53 are engaged at their inner margins within respective radially outwardly facing annular grooves 54 defined in the inner, proximal portion of the piston flange 50 between the body portion of the flange and shorter integral retaining flanges 55 which have their radially outer edges 57 tapered toward the main body of the flange and outwardly whereby to direct hydraulic fluid during pressure stroke toward the body and outer margin of the associated valve disk ring 53 to seat the same firmly against the opposing end face of the piston flange for effectively closing the replenishing ports 52.

Efficiency in piston ring action of the valve disk rings 53 is enhanced by the provision of a plurality of pressure back-up access ports 58 communicating the side faces of the piston flange radially inwardly from the retainer flanges 55 with the roots of the groove 54. Thereby, on the pressure side of the piston flange high pressure fluid entering through the respective access ports 58 acts with substantial uniformity between the root of the affected groove 54 and the inner edge of the pressure-opposing valve-piston ring to exert radially outward pressure expanding the ring into tight wiping, sealing engagement at its outer edge against the cylindrical wall defining the working chamber 17'. Hence, the rings 53 may be of an outside diameter having slightly undersize tolerance relative to the cylinder diameter, which is advantageous for replenishing flow valve opening flexure of the ring 53 on the low pressure side of the piston flange 50.

For square-law damping characteristics, as nearly as practicable, all damping fluid displacement through the piston flange 50 is by way of, and is controlled by, the size of a damping, metering orifice 59 extending entirely through the flange between the opposite axial faces thereof and suitably angularly spaced from the replenishing passages 51. By reason of substantial length, the damping orifice 59 affords substantial, and efficient flow resistance to the pressurized damping fluid. By having the metering orifice 59 in communication with the roots of the valve disk grooves 54, pressure stroke valve disk pressurization supplementary to the ports 58 is attained.

In a practical construction, the piston ring valve disks 53 may be made as molded or cast members from a suitable plastic material of which polytetrafluoroethylene, commerically available as Teflon, has been found desirable. Such a plastic material has the resiliently flexible, elastic properties advantageous for the operating characteristics described.

A damper 60 according to the principles of the present invention and equipped for adjustment of its damping resistance or strength is shown in FIGURES 8–9. This damper comprises three major operating components, including a pair of generally cup-shaped housing members 61 and 62, one of which is telescopically interengaged within the other, and a piston member or unit 63. In this instance, the casing or housing member 61 is substantially shorter than the member 62 and has extending from its base or head end portion an axial flange 64 which is press fitted into the outer end portion of an elongated axial internally cylindrical flange 65 of the housing member 62. Within the housing member 62 between its closure base or head end portion and the inner end of the flange 64 is defined with the inner wall of the flange 65 a cylindrical working chamber 67.

Displacement of the telescopically interengaged member 61 from the outer end portion of the housing flange 65 is prevented by securing or retaining screws 68 threadedly engaged in the outer end of the flange 65 and having their heads retainingly lapping respective outwardly facing shoulders 69 afforded by slabbing off diametrically opposite sides of that portion of the housing member 61 which, in this instance, projects outwardly beyond the end of the flange 65.

Reciprocably operative in the working chamber 67 is an annular piston flange 70 integral in one piece intermediately along the length of and projecting radially from a piston rod 71 of the piston unit 63. In this instance, the perimeter of the piston flange 70 is as close fitting as practicable in the cylinder to reduce to a minimum pressure fluid leakage about the piston periphery in operation. This piston rod 71 is of suitably smaller diameter than the cylindrical wall of the working chamber 67 to afford the desired volume of hydraulic damping fluid in the subchambers into which the piston flange 70 divides the working chamber.

Balanced operating reciprocal guidance of the piston rod 63 in the housing is afforded by bearing engagement of the portion of the piston rod which extends through the end of the working chamber nearest the housing member 61 by a limited width bearing flange portion 72 on the inner end margin of the flange 64. In this instance, the free extremity of the engaged end portion of the piston rod is accommodated throughout its range of reciprocal movement by a clearance chamber 73 within the housing member 61. That portion of the piston rod 71 extending beyond the opposite side of the piston flange 70 is supported in slidable bearing relation through a bearing bore 74 through the head end portion of the housing member 62.

At one end of the damper 60, attachment to one of the opposed relatively oscillatably or reciprocably moveable members of the device or apparatus with which the damper is used is adapted to be effected by attaching an outward extension 75 of that portion of the piston rod 71 which extends outwardly from the housing member 62. For this purpose, the piston rod extension 75 may be provided with a transverse pin-receiving bore 77. At its opposite end, the damper unit is adapted to be attached to the other of the relatively moveably members by means conveniently comprising a pair of spaced parallel coextensive attachment ears 78 which are desirably provided with aligned connecting pin-receiving apertures 79 therethrough. In this instance, the attachment ears 78 are conveniently constructed as integral extensions of the housing flange 65.

Damping energy absorption is attained by displacement of hydraulic damping fluid from the pressure side of the piston flange 70 to the low pressure side through a damping passage comprising radial bores or ports 80 on respectively opposite sides of and close to the piston flange 70 and through the wall of the piston rod 71 and a hollow interior axially extending metering bore chamber 81. Within this metering bore is an adjustable control valve 82 which in a convenient form comprises an elongated screw-like threaded body engaging the complementally threaded wall defining the bore and having an intermediate reduced diameter passage portion 83 disposed in general alignment with the inner ends of the ports 80. By adjusting the screw valve 82 any desired restriction of the flow path through the ports 80 and across the inset flow portion 83 may be effected. Such adjustment may be made by means of a suitable tool inserted through an outward extension 84 of the valve bore and into which access is had through the outer end of the piston rod extension 75, a closure plug 85 being desirably secured into the outer end portion of the access bore extension after valve adjustment has been completed.

Elimination of external seals between relatively moveable working parts of the damper 60 is enabled by equipping the damper with a rubber boot 87 of generally bellows corrugated form to enable easy elongation and contraction. One end portion of the boot 87 is provided with an axial attachment flange 88 which engages about the outward extension of the piston rod 71 and is secured thereto as by means of a helical compression ring 89. At its opposite end portion, the boot 87 has an annular axial attachment flange 90 which embraces the perimeter of an annular radially extending flange 91 about the open end margin of the housing flange 65, with a helical compression retaining ring 92 securing the boot flange in place. To assist in retention of the attachment flanges 88 and 90 of the boot, the respective surfaces of the piston rod 71 and the flange 91 engaged thereby are provided with anti-slip means suitably comprising knurling, annular grooving, or the like, 93. Through this arrangement, the boot 87 encloses the only external joint between moving elements of the damper, namely, between the piston rod 71 and the bearing 74, and further provides a replenishing reservoir area, and sealing means.

Communication between the replenishing reservoir afforded by the boot 87 and the working chamber 67 is by way of communication passages through the housing member 62. For this purpose, a port 94 is provided through the closure head end portion of the housing member 62 opening into one end of the working cylinder chamber 67, with a ring disk check valve 95 in control of the working chamber end of the port. At its outer edge, the check valve 95 is loosely seated in a radially inwardly opening groove 97 in the adjacent head end of the working chamber cylinder and of sufficiently greater width than the thickness of the check valve to enable displacement of the check valve away from the port 94 for replenishing inflow of hydraulic fluid and free return of the check valve into full checking relation to the port during pressure damping strokes theretoward by the piston flange 70.

At the opposite end of the working chamber 67, communication with the replenishing reservoir is effected through an axially extending passage slot 98 leading from the inner end of the flange 64 on its outer perimeter and communicating with an annular groove 99 in such perimeter which registers with a communication port 100 through the housing flange 65 and leading from the replenishing reservoir adjacent to the boot-mounting flange 91.

In control of the replenishing passage 98 is a disk ring check valve 101 similar to the check valve 95 and having its outer perimeter engaged in a radially inwardly opening groove in the cylinder wall aligned with the inner end of the flange 64 and of a sufficiently greater width than the thickness of the check valve to enable ample replenishing flow displacement of the check valve. During pressure strokes of the piston flange 70 toward the check valve 101 the replenishing flow passage 98 is closed against escape of hydraulic fluid from the working chamber 67. Further, by having the check valve 101 extending across the joint between the flanges 64 and 65, such joint is sealed thereby against high pressure fluid escape therethrough. Should some hydraulic fluid be forced through this joint nevertheless, it will be drained off to the replenishing reservoir through the groove 99.

Any hydraulic fluid which is driven past the piston rod 71 through the bearing 72 during pressure strokes theretoward returns to the replenishing chamber from the clearance space 73 through a radial port 103 communicating such space with the groove 99. This arrangement also facilitates filling of the damper and the replenishing chamber with hydraulic fluid which is adapted to be effected through a filler opening 104 through the closure head end of the housing member 61 into the space 73, and closed in service by filler plug member 105.

It will be understood that modifications and variations may be effected without departing from the scope of the novel concepts of the present invention.

We claim as our invention:

1. A piston type hydraulic damper of the character described comprising:
    a housing including a pair of generally cup-shaped members each of which has a closure head end portion and an axially extending tubular flange, said tubular flanges being of differential diameter and being assembled one within the other with the head end portions at opposite ends of the assembly whereby the inner of said flanges and the head end portions define a working chamber;
    each of said end portions having a bearing bore of smaller diameter coaxially aligned and opening from said working chamber;
    a piston unit comprising a piston rod extending through said chamber and in guided bearing engagement in said bearing bores and having a piston flange intermediately thereon dividing said working chamber into subchambers, the piston rod having a hollow interior chamber and passage means associated with said piston flange for displacement of hydraulic damping fluid between said interior and said working chamber on both sides of said flange;
    valve means controlling said displacement in the relative working reciprocations of the piston and housing;
    one end portion of the piston rod projecting substantially beyond the head end portion of one of said members and having means thereon for attaching the projecting portion of the piston rod to one of two opposed spaced relatively moveable members to be damped;
    means on the head end portion of the other of said housing members for attaching the damper to the members to be damped;
    means for filling said hollow interior chamber comprising a filler opening in the end of said piston rod exposed for access outside said housing adjacent to said last mentioned attaching means and a filler plug screwed thereinto and adapted to place hydraulic fluid filled through the opening into said hollow interior chamber under pressure; and
    a compressible pressurizing body mounted in said hollow interior chamber and adapted to be compressed by the pressurized hydraulic fluid to maintain replenishing pressure thereon to maintain the working chamber filled through said passage means.

2. In a piston type hydraulic damper of the character described:
    a housing providing a cylindrical working chamber;
    a piston reciprocable in said working chamber and having a piston rod with a hollow interior chamber and extending through said working chamber and supported in balanced bearing reciprocable relation by the housing;
    hydraulic damping fluid in said hollow interior chamber and in said working chamber;
    check valved passage means associated with said piston and communicating said hollow interior chamber with said working chamber on both sides of the piston; and
    a compressibly yieldable body in said hollow interior compressed by the hydraulic fluid and thereby maintaining continuous replenishing pressure on the fluid in said interior chamber.

3. A piston type hydraulic damper of the character described comprising:
    a housing including a pair of generally cup-shaped members having differential diameter oppositely axially extending tubular flanges telescopically interengaged and opposite end closure head portions on the members, the inner end of the inner of said flanges engaging the head portion of the other of said members, said inner flange being in close engagement with the outer of the flanges adjacent to the outer end of said outer flange and in spaced relation thereto throughout the remainder of the inner of the flanges and defining an annular space with the outer of the flanges, with a bleed groove across the inner end of the inner of said flanges, and the inner of said flanges providing a working chamber cylinder, said groove communicating said annular space with said working chamber;
    a piston reciprocably operable in said cylinder;
    means for securing the piston and the housing to respective members, the motion between which it is to be damped;
    means securing said housing members together; and
    means sealing the joint between said outer portion of the outer flange and the inner flange.

4. In a piston type hydraulic damper:
    means providing a housing defining a working cylinder chamber therein;
    a piston in said working chamber dividing the same into subchambers and having a piston rod extending in opposite directions from the piston in reciprocable bearing relation on the housing, said piston rod being hollow and defining therein a replenishing chamber for hydraulic fluid; and
    means providing communication between said replenishing chamber and the subchambers comprising check valved passages extending from within said replenishing chamber through said rod and directly therefrom into and through said piston.

5. A damper as defined in claim 4, wherein linear damping characteristics are attained by damping fluid displacement between the periphery of the piston and the cylinder of the working chamber and passages comprising radial passages having their outer ends adjacent to the outer perimeter of said piston and ball check valves cooperating with the outer ends of said passages.

6. A damper as defined in claim 4, wherein square-law damping is effected and the piston has a damping orifice therethrough for damping fluid displacement, and said means affording communication comprising radial passages with axially extending ports opening through the piston and combination check valve and piston ring disks controlling said ports.

7. A damper as defined in claim 6, in which said piston ring disk valves are of a resiliently flexible elastic material and means are provided for pressure loading the respective valve on the pressure side of the piston to thrust radially outwardly into increased piston ring engagement with the cylinder.

8. A piston type hydraulic damper of the character described especially adapted for use as a flutter damper and comprising:
  a housing including a pair of generally cup-shaped members having oppositely extending tubular flanges which are telescopically interengaged and defining a cylindrical working chamber, with aligned bearing bores of smaller diameter than and extending from opposite ends of the working chamber to and through the outer ends of the respective housing members;
  a piston comprising a piston flange in working relation in said chamber and a rod having a replenishing chamber therein communicating through said flange with the working chamber on both sides of said flange, and the rod projecting beyond opposite sides of said flange and in relatively reciprocable and balanced bearing engagement in said bores, with one portion of said rod extending outwardly beyond one of the housing members and having means on the outwardly extending portion thereof for attachment to one of a pair of relatively movable members, the motion of which is to be damped;
  a pair of spaced coextensive ears projecting from the other of said housing members in the opposite direction from said projecting portion of the rod and adapted to be attached to the other of the relatively moveable members; and
  the end portion of the rod adjacent to said ears having a replenishing opening closed by a plug accessible between said ears for introducing replenishing fluid into the replenishing chamber.

9. A piston type hydraulic damper of the character described comprising:
  a housing including telescopically interengaged members defining a cylindrical working chamber and having aligned bearing bores of smaller diameter than and extending from opposite ends of the working chamber;
  hydraulic damping fluid in said working chamber;
  a piston and rod unit comprising a piston flange in reciprocable working relation in said chamber and a rod projecting beyond opposite sides of said flange and in relatively reciprocable and balanced bearing engagement in said bores;
  said piston rod having a hollow interior longitudinal bore chamber extending throughout at least most of the length of the rod and to a substantial extent beyond the opposite side of said flange and including passage means in said unit aligned and associated with said flange for displacement of hydraulic fluid between said interior bore chamber and said working chamber on both sides of said flange; and
  valve means carried by the unit aligned with said flange in controlling relation to said passage means to control said displacement in the relative working reciprocations of the piston and housing;
  said hollow interior bore chamber of the piston rod providing a hydraulic fluid replenishing chamber and said passage means comprising a passage bore extending from said chamber and through said flange and thereby communicating with both sides of the flange.

10. A hydraulic damper as defined in claim 9, in which said valve means are carried by said piston flange.

11. A piston type hydraulic damper of the character described comprising:
  a housing including telescopically interengaged members defining a cylindrical working chamber and having aligned bearing bores of smaller diameter than and extending from opposite ends of the working chamber;
  hydraulic damping fluid in said working chamber;
  a piston and rod unit comprising a piston flange in reciprocable working relation in said chamber and a rod projecting beyond opposite sides of said flange and in relatively reciprocable and balanced bearing engagement in said bores;
  said piston rod having a hollow interior longitudinal bore chamber extending throughout at least most of the length of the rod and to a substantial extent beyond the opposite sides of said flange and including passage means in said unit aligned and associated with said flange for displacement of hydraulic fluid between said interior bore chamber and said working chamber on both sides of said flange; and
  valve means carried by the unit aligned with said flange in controlling relation to said passage means to control said displacement in the relative working reciprocations of the piston and housing;
  said valve means comprising ball check valves and said piston flange having ball check valve recesses in its outer perimeter, into which recesses branches of said passage means extend from within said bore chamber and are controled by said ball check valve, one of said ball check valves being operable to close its branch of the passage means in one reciprocal direction of movement of the piston and rod unit and the other of said ball check valves being operable to close its passage branch in the opposite reciprocal direction of movement of the piston and rod unit.

12. A method of assembling a piston type hydraulic damper having a housing defining a working chamber cylinder and a piston reciprocable therein and having a hollow piston rod providing a replenishing chamber communicating with the working chamber, the piston rod being supported in balanced reciprocable bearing relation by the housing, with one end of the piston rod providing a filler opening with a compressibly yieldable body in said replenishing chamber:
  filling said replenishing chamber up to the filler end of said piston rod with hydraulic fluid; and
  moving filler plug into said filler opening substantially inwardly beyond said end and thereby displacing the hydraulic fluid inwardly against said compressible yieldable body whereby to compress and displace the body and thereby provide replenishing pressure in the hydraulic fluid.

References Cited

UNITED STATES PATENTS

| | | |
|---|---|---|
| 1,886,712 | 11/1932 | Messier. |
| 2,716,470 | 8/1955 | Focht _____ 188—100 X |
| 2,808,904 | 10/1957 | O'Connor et al. ____ 188—100 X |
| 2,888,106 | 5/1959 | Peras _____ 188—100 X |
| 2,936,860 | 5/1960 | Peras _____ 188—100 X |
| 3,074,708 | 1/1963 | Lush et al. _____ 188—100 X |

MILTON BUCHLER, *Primary Examiner.*

FERGUS S. MIDDLETON, *Examiner.*

G. E. HALVOSA, *Assistant Examiner.*